(12) United States Patent
Austen et al.

(10) Patent No.: US 9,747,736 B2
(45) Date of Patent: Aug. 29, 2017

(54) MULTIPLE-BAND IDENTIFICATION AND RANGING

(71) Applicant: Texas Instruments Deutschland GmbH, Freising (DE)

(72) Inventors: Jürgen Stefan Austen, Fraunberg (DE); Jens Graul, Freising (DE); Andreas Hagl, Dachau (DE)

(73) Assignee: TEXAS INSTRUMENTS DEUTSCHLAND GMBH, Freising (DE)

(*) Notice: Subject to any disclaimer, the term of this patent is extended or adjusted under 35 U.S.C. 154(b) by 76 days.

(21) Appl. No.: 14/452,464

(22) Filed: Aug. 5, 2014

(65) Prior Publication Data
US 2016/0042579 A1 Feb. 11, 2016

(51) Int. Cl.
G07C 9/00 (2006.01)

(52) U.S. Cl.
CPC ............ *G07C 9/00309* (2013.01); *G07C 2009/00357* (2013.01); *G07C 2009/00769* (2013.01); *G07C 2209/63* (2013.01)

(58) Field of Classification Search
CPC ............ G07C 9/00007; G07C 9/00658; G07C 9/00666; G07C 9/00674; G07C 9/00682; G07C 9/0069; G07C 9/00698; G07C 9/00706; G07C 9/00714; G07C 9/00722; G07C 9/00746; G07C 2009/00769; G07C 2009/0038; G07C 2009/00309; G07C 2009/00341; G07C 2009/00357; G07C 2009/00658; G07C 2009/00365; G07C 2009/00373; G07C 2209/63; G07C 2209/64; G07C 2209/65
See application file for complete search history.

(56) References Cited

U.S. PATENT DOCUMENTS

| | | | | |
|---|---|---|---|---|
| 6,552,649 | B1* | 4/2003 | Okada | B60R 25/2036 307/10.1 |
| 2004/0075532 | A1* | 4/2004 | Ueda | E05B 77/48 340/5.72 |
| 2006/0202798 | A1* | 9/2006 | Baumgartner | B60R 25/2072 340/5.61 |
| 2007/0279286 | A1* | 12/2007 | Coutts | H01Q 9/0407 343/700 MS |
| 2009/0284345 | A1* | 11/2009 | Ghabr | B60R 25/24 340/5.61 |
| 2012/0062358 | A1* | 3/2012 | Nowottnick | G06K 19/07767 340/5.2 |

(Continued)

*Primary Examiner* — Laura Nguyen
(74) *Attorney, Agent, or Firm* — John R. Pessetto; Charles A. Brill; Frank D. Cimino

(57) ABSTRACT

A long-range power-efficient multiple-band identification system and method includes, for example, a base-station control module and paired electronic key fob. The base-station control module and paired electronic key fob is arranged to provide a UHF (ultra-high frequency) wake transmitter for transmitting a wakeup signal in a UHF frequency range to the paired electronic key. When in range, the electronic key is awakened by the wakeup signal and in response transmits an acknowledgment reply to the base-station control module. After receiving the acknowledgment, the base-station control module transmits a relatively high power localization signal for determining an electronic key location.

15 Claims, 7 Drawing Sheets

(56) References Cited

U.S. PATENT DOCUMENTS

2014/0051359 A1* 2/2014 Dina .................. H04W 8/005
                                                    455/41.2
2015/0077225 A1* 3/2015 Proefke ............. G07C 9/00182
                                                    340/5.72

* cited by examiner

US 9,747,736 B2

MULTIPLE-BAND IDENTIFICATION AND RANGING

BACKGROUND

Conventional wireless access systems provide mechanisms for identification as well as ranging. The identification and ranging mechanisms provide information used to determine whether to allow access to secured areas such as in buildings, secured outdoor areas, and/or vehicles. For example, many automobiles are sold having key fobs that are electronically matched with a particular vehicle and allow a holder of the key fob to gain access to and operate the particular vehicle. The functionality of the key fobs and associated control systems is being increased to response to ever-increasing demands for increased security by individual users and automobile insurance companies, among others.

The key fob is arranged to wirelessly communicate with a base-station control module that is powered by a battery (which often stores upwards of 100 amp-hours) of the particular vehicle. In contrast, the key fob is portable and designed to be light weight and to easily fit in the palm of a hand, pocket, or a purse, for example. As the functionality of the key fob-actuated systems increase, the demand for power by the electronic circuit designs and applications that provide the functionality increase. The increase in power usage can, for example, which can shorten the operating time before having to recharge or replace batteries in the vehicle and/or key fob.

SUMMARY

The problems noted above can be addressed in a multiple-band identification and ranging system and method includes, for example, a base-station control module and paired electronic key fob. The base-station control module and paired electronic key fob is arranged to provide a UHF (ultra-high frequency) wake transmitter for transmitting a UHF wakeup signal to the paired electronic key. When in range, the electronic key is awakened by the wakeup signal and in response transmits an acknowledgment reply to the base-station control module. After receiving the acknowledgment, the base-station control module transmits a relatively high power localization signal for determining an electronic key location.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and accordingly are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "portion" can mean an entire portion or a portion that is less than the entire portion. The term "calibration" can include the meaning of the word "test." The term "input" can mean either a source or a drain (or even a control input such as a gate where context indicates) of a PMOS (positive-type metal oxide semiconductor) or NMOS (negative-type metal oxide semiconductor) transistor. The term "pulse" can mean a portion of waveforms such as periodic waveforms. The term "transceiver" includes the meaning of transmitter and receiver, where the transmitter and receiver are independently operable of each other (e.g., both can be on, either can be on, and both can be off during operation of the system that includes the transceiver).

Figure 1:
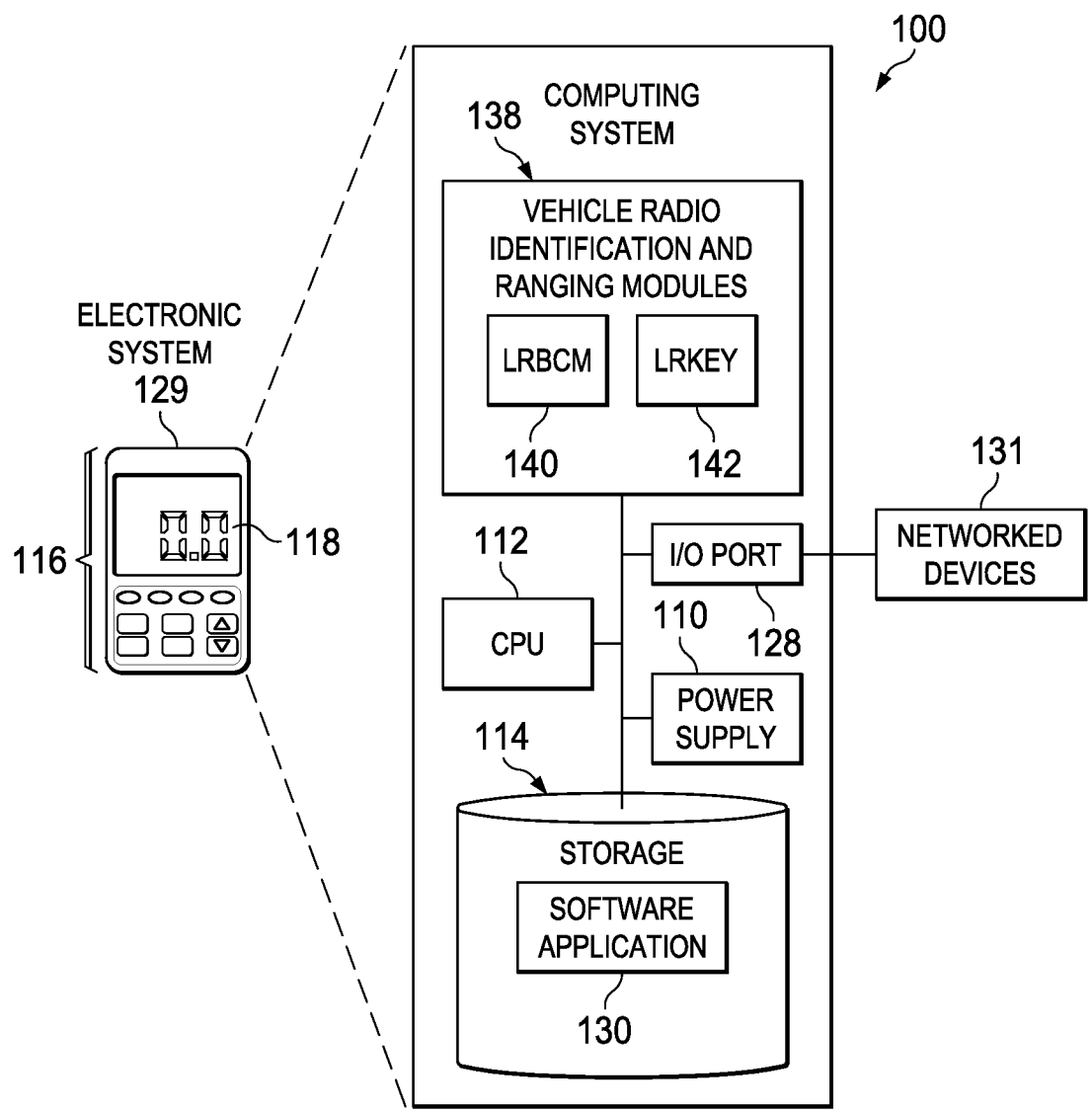
FIG. 1 shows an illustrative electronic device in accordance with example embodiments of the disclosure.

FIG. 1 shows an illustrative computing system 100 in accordance with preferred embodiments of the disclosure. For example, the computing system 100 is, or is incorporated into, an electronic system 129, such as a computer, electronics control "box" or display, communications equipment (including transmitters), or any other type of electronic system arranged to generate radio-frequency signals.

In some embodiments, the computing system 100 comprises a megacell or a system-on-chip (SoC) which includes control logic such as a CPU 112 (Central Processing Unit), a storage 114 (e.g., random access memory (RAM)) and a power supply 110. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The storage 114 (which can be memory such as on-processor cache, off-processor cache, RAM, flash memory, or disk storage) stores one or more software applications 130 (e.g., embedded applications) that, when executed by the CPU 112, perform any suitable function associated with the computing system 100.

The CPU 112 comprises memory and logic that store information frequently accessed from the storage 114. The computing system 100 is often controlled by a user using a UI (user interface) 116, which provides output to and receives input from the user during the execution the software application 130. The output is provided using the display 118, indicator lights, a speaker, vibrations, and the like. The input is received using audio and/or video inputs (using, for example, voice or image recognition), and electrical and/or mechanical devices such as keypads, switches, proximity detectors, gyros, accelerometers, and the like. The CPU 112 is coupled to I/O (Input-Output) port 128, which provides an interface that is configured to receive input from (and/or provide output to) networked devices 131. The networked devices 131 can include any device (including key fobs or base-station control modules that are electronically paired with the computing system 100) capable of point-to-point and/or networked communications with the computing system 100. The computing system 100 can also be coupled to peripherals and/or computing devices, including tangible, non-transitory media (such as flash memory) and/or cabled or wireless media. These and other input and output devices are selectively coupled to the computing system 100 by external devices using wireless or cabled connections. The storage 114 can be accessed by, for example, by the networked devices 131.

The CPU 112 is coupled to I/O (Input-Output) port 128, which provides an interface that is configured to receive input from (and/or provide output to) peripherals and/or computing devices 131, including tangible (e.g., "non-transitory") media (such as flash memory) and/or cabled or wireless media (such as a Joint Test Action Group (JTAG) interface). These and other input and output devices are selectively coupled to the computing system 100 by external devices using wireless or cabled connections. The CPU 112, storage 114, and power supply 110 can be coupled to an external power supply (not shown) or coupled to a local power source (such as a battery, solar cell, alternator, inductive field, fuel cell, capacitor, and the like).

The computing system 100 includes vehicle radio identification and ranging modules 138. The computing system 100 includes a long range base-station control module (LRBCM) 140 (such as long-range base-station control module 502 discussed below discussed below with reference to FIG. 5) and long-range key (LRKEY) 142 (such as key fob 600 discussed below with reference to FIG. 6). The LRBCM 138 is adapted for multiple-band (UHF and LF) identification and ranging.

The disclosed multiple-band identification and ranging system addresses, for example, issues of conserving power and accurately localizing a portable electronic key fob. The multiple-band identification and ranging system includes a very low (e.g., not noticeable by a user) latency ultra-low power UHF receiver integrated with an on-demand, precise low frequency (LF) radio ranging system. The combination of low latency, low power, long-range, and other such requirements tends to limit the operating range of communications over the LF frequency range (e.g., channel) due to the key fob sensitivity and the maximum transmit power on the base-station side. The latency and sensitivity of the key fob is limited by the capacity of the small battery in the key fob, while transmit power of the polling vehicle side is limited by the capacity of the vehicle battery. Conventional systems are discussed below with reference to FIG. 2, FIG. 3, and FIG. 4.

Figure 2:
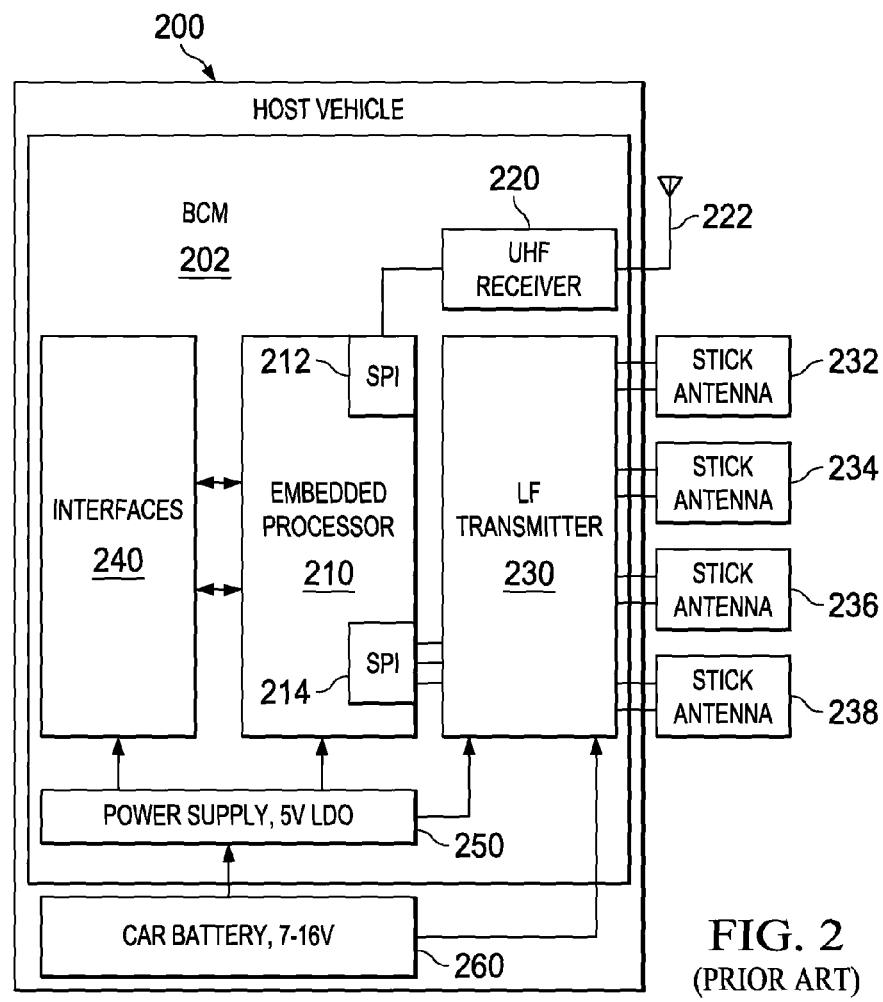
FIG. 2 is a block diagram illustrating a conventional base-station control module (BCM).

FIG. 2 is a block diagram illustrating a conventional base-station control module (BCM). Generally described, a host vehicle 200 includes a base-station control module 202, an embedded processor 210, an ultra-high frequency (UHF) receiver 220, a low frequency (LF) transmitter 230, interfaces 240, power supply 250, and a car battery 260.

The embedded processor 210 is coupled to the UHF receiver 220, the LF transmitter 230, the system interface 240, and the power supply 250. The embedded processor 210 is a processor such as CPU 112 and is arranged to execute instructions for initializing and handling tasks associated with the functions of the various components of the base station control module 202. The embedded processor 210 includes serial-to-parallel interfaces (SPI) 212 and 214.

The SPI 212 is coupled to the UHF receiver 220 and is arranged for coupling communications between the UHF receiver 220 and the embedded processor 210. Such communications include, for example, configuration and status commands sent by the embedded processor 210 to the UHF receiver 220 and receiving information received by the UHF receiver 220 via antenna 222.

The SPI 214 is coupled to the LF transmitter 230 and is arranged for coupling communications between the LF transmitter 230 and the embedded processor 210. Such communications include, for example, configuration and status commands sent by the embedded processor 210 to the LF transmitter 230 as well as sending control and information to the LF transmitter 230 for transmission via one or more stick antennas such as stick antennas 232, 234, 236, and 238.

The base-station control module 202 is arranged with a system interface 240 for sending and receiving information across one or more networks of the host vehicle 200. For example, the base-station control module 202 is arranged to wirelessly query the electronic key (e.g., using encrypted communications) to authenticate whether the key fob has been "paired" (e.g., having been provisioned with one or more encryption keys for establishing a secure communication link) with the base-station control module 202. After authentication (e.g., identification) of the key fob, the system interface 240 sends an indication of the positive status of the authentication to one or more components of the host vehicle 200 across respective networks of the host vehicle 200. The one or more components of the host vehicle 200, for example, respond to the indication of the positive status of the authentication by allowing access for controlling the one or more components of the host vehicle 200.

The power supply 250 is arranged to receive power from the car battery 260 that is used to power the host vehicle 200. Such power is typically unregulated and has a normal voltage operating range of 7 to 16 volts (nominally 12 volts). The power supply 250 is typically a low dropout (LDO) power supply is arranged for supplying power to active components of the base-station control module. The output voltage of the power supply 250 is regulated at 5 volts over the normal operating voltage range of the car battery 260.

Figure 3:
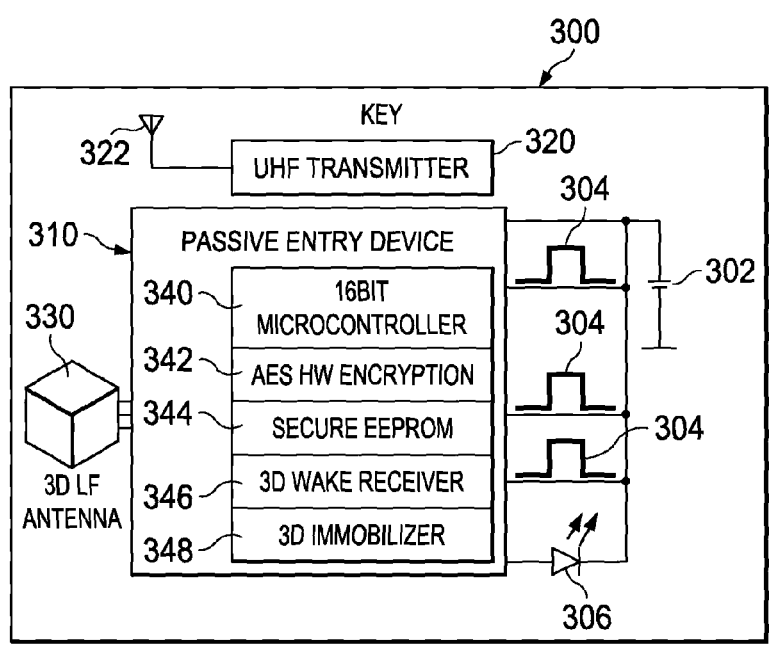
FIG. 3 is a block diagram illustrating a conventional electronic key.

FIG. 3 is a block diagram illustrating a conventional electronic key. Generally described, key fob 300 is an electronic key that includes a power source (such as coin cell 302), buttons 304, indicator 306, a passive entry device 310, UHF transmitter 320, and three-dimensional (3D) LF antenna 330. Cell 302 is arranged for providing power to active components of electronic UHF of the key fob 300.

Buttons 304 are arranged for providing user input so that a user can select a command for transmitting to a paired base-station control module (such as base-station control module 202). Selectable commands include "lock," "unlock," "panic," and the like. Indicator 306 is arranged to provide an indication of functioning of the key fob 300.

The passive entry device 310 includes a 16 bit microcontroller 340, Advanced Encryption Standard (AES) hardware (HW) encryption module 342, secure EEPROM (electrically erasable programmable nonvolatile memory) 344, three-dimensional wake receiver 346, and three-dimensional immobilizer 348. The passive entry device 310 is arranged for communicating with base-station control module 202 via the UHF transmitter 320 (and UHF transmitter antenna 322) and the three-dimensional LF antenna 330. Such communications are described below with respect to FIG. 4.

Figure 4:
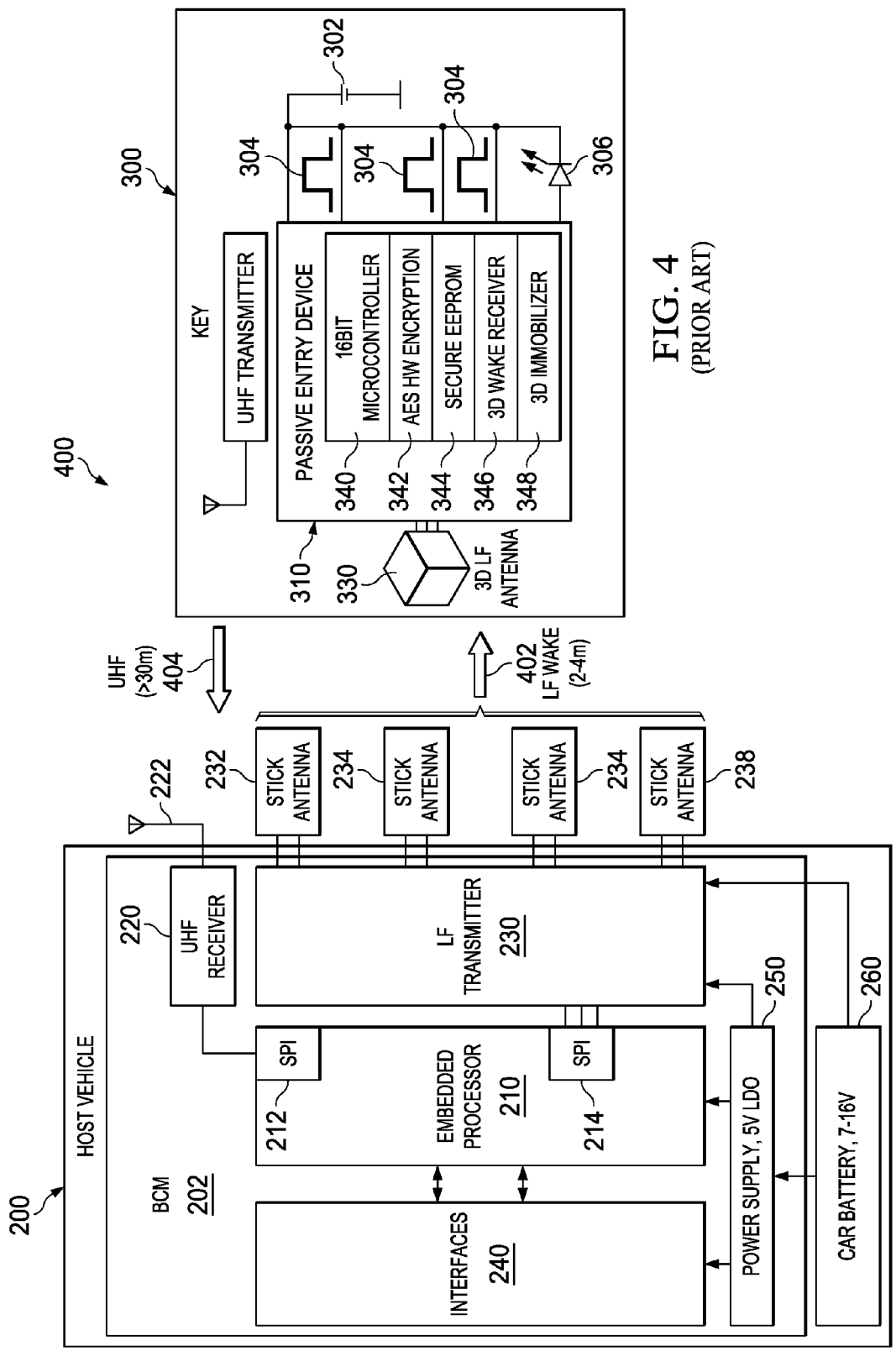
FIG. 4 is a system diagram illustrating communications of a conventional radio identification and ranging system.

FIG. 4 is a system diagram illustrating communications of a conventional radio identification and ranging system. Generally described, system 400 includes a base-station control module 202 that has been paired with a key fob 300. In an example scenario, key fob 300 is in a sleep mode, which reduces power consumption of the (e.g., battery-operated) key fob 300.

When a user of the key fob 300 approaches within around 2-4 meters of an antenna of a base-station control module 202 that is located in a host vehicle 200, the three-dimensional wake receiver 346 of the key fob 300 detects an LF wake signal 402. (The LF wake signal 402 is transmitted by the LF transmitter 230 for example in response to door handle activity or on a repeated basis every few hundreds of milliseconds.) When the three-dimensional wake receiver 346 detects an LF wake signal 402, the three-dimensional wake receiver 346 commands the key fob 300 to exit the sleep mode and enter an active mode (which increases power consumption of the key fob 300).

When the key fob 300 enters the active mode, the key fob 300 transmits a UHF signal 404 to, for example, initiate authentication procedures and determine a relative position of the key fob 300 to the host vehicle 200. The UHF signal 404 typically is transmitted over a range of greater than 30 meters in response to a user pressing a button 304. The transmission of the UHF signal 404 at a range of greater than 30 meters consumes substantially more power than transmission of a short range signal, such as the LF wake signal 402, which typically has a range of around 2-4 meters.

The system 400 includes functionality for vehicle identification as well as for relative position ranging of the host vehicle 200 and the key fob 300. Such relative positioning is used to help avoid vehicle theft as well as accidental starting of the vehicle from the outside, for example. The combination of these two functions often result in a limited operating range over the low frequency (LF) channel because of the (e.g., lower) key fob 300 sensitivity and the (e.g., limited) maximum transmit power of the base-station control module 202 from the host vehicle 200. For example, the key fob 300 sensitivity is limited by the relatively small capacity (e.g., around 230 milliamp-hours) of the small battery in the key fob 300, while the transmit power of the continuously polling from the host vehicle 200 is limited by the capacity of the car battery 260. In contrast, a long-range portable radio identification and ranging system and method is disclosed herein that includes a relatively low latency ultra-low power UHF transceiver and an on-demand precision LF radio ranging system.

Figure 5:
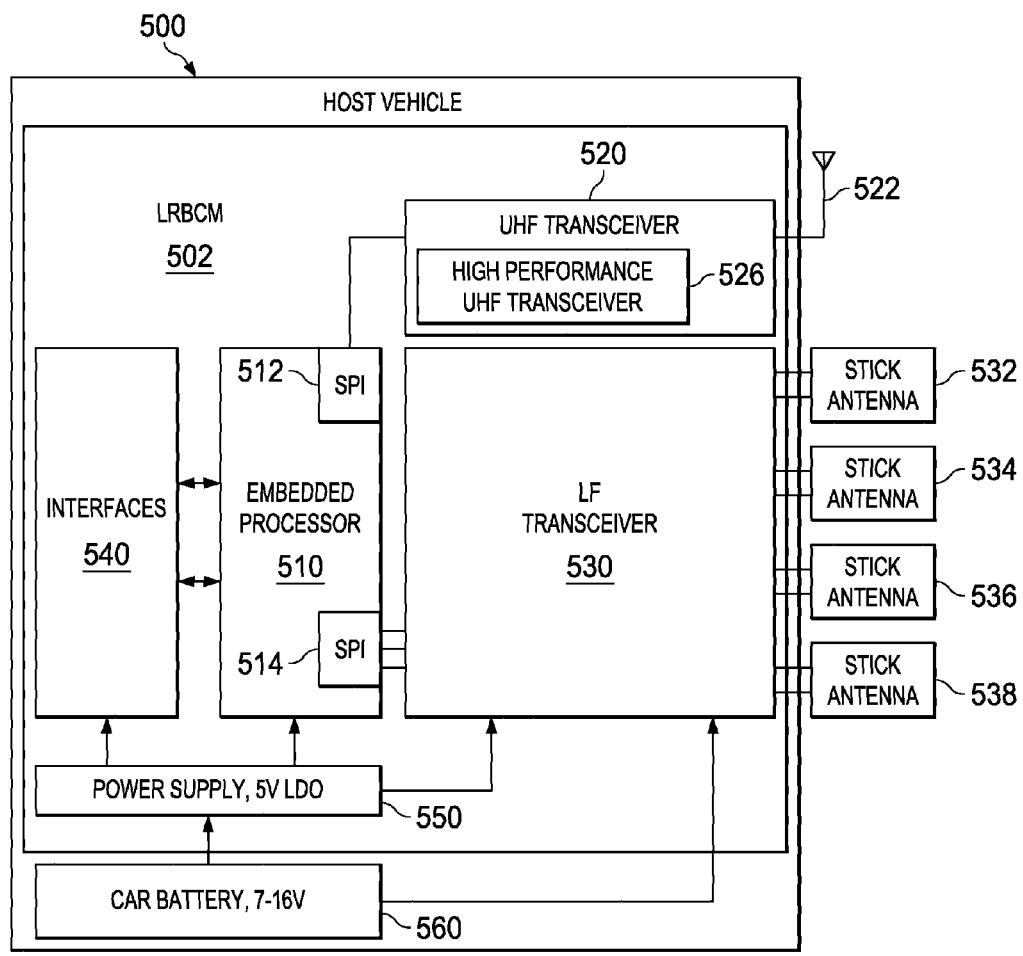
FIG. 5 is a block diagram illustrating a multiple-band base-station control module of a host vehicle in accordance with example embodiments of the disclosure.

FIG. 5 is a block diagram illustrating a multiple-band base-station control module of a host vehicle in accordance with example embodiments of the disclosure. Generally described, of a host vehicle 500 includes a long-range base-station control module 502. The long-range base-station control module 502 includes an embedded processor 510, an ultra-high frequency (UHF) transceiver 520, a low frequency (LF) transceiver 530, interfaces 540, power supply 550, and a transportable power source such as car battery 560.

The ultra-high frequency (UHF) transceiver 520 includes a high performance UHF transceiver 526. The high performance UHF transceiver 526 is arranged to generate and transmit a wakeup signal using one or more selected frequencies in a frequency range of 300 MHz through 2.4 GHz (UHF). The high performance UHF transceiver 526 is arranged to transmit and receive normal power communications between the host vehicle 500 and the paired key fob (e.g., the high performance UHF transceiver 526 can be powered up from a sleep mode and activated after the key fob 600 has been awakened by the transmitted wakeup signal, discussed below). The disclosed long-range base-station control module 502 saves power because, for example, the lower-power-consuming UHF transceiver 526 is used for transmitting the wakeup signal (in contrast with conventional systems which normally continuously broadcast the wakeup signal using the higher power-consuming LF transmissions).

The UHF transceiver 526 typically consumes a supply current in the range of 10 mA to 40 mA as compared with the LF transceiver 530, which instead consumes a supply current in the range of 1A to 4A (e.g., which is supplied from a battery that often contains less than 100 amp-hours of charge). Accordingly, the disclosed long-range base-station control module 502 in an embodiment can have a reduced current draw by a factor of 100 over conventional solutions. Also, the far-field (e.g., E-field) damping of UHF frequencies is 20 dB/decade, which allows a higher communication ranges than ranges achieved using LF frequencies (which has near-field, e.g., H-field, damping of 60 dB/decade). Because the strong decay of the LF near-field allows for much superior range resolution (e.g., over UHF-based localization), the LF transceiver 530 is normally used for localization of the key fob 600.

The UHF transceiver 526 provides a low-power, long-range solution for polling the key fob 600 by sending a short, periodic UHF signal from the host vehicle 500 to query the key fob 600. The key fob is arranged to receive the query within a range of more than 10 meters. When the key fob 600 is in range, the key fob 600 receives the query and in response sends an appropriate acknowledgement response. When the acknowledgement response is correct, the host vehicle 500 can, for example, execute an intended function such as "welcome illumination" or other comfort functions. At this point, the location of the key fob 600 has not yet been precisely localized, for example, because of the UHF frequency damping characteristics. To more accurately localize the key fob 600 within a closely defined range, the key fob 600 is operable to perform a LF received signal strength indicator (RSSI) measurement and send the determined RSSI information to the long-range base-station control module 502.

The embedded processor 510 is coupled to the UHF transceiver 520, the LF transceiver 530, the system interface 540, and the power supply 550. The embedded processor 510 is a processor such as CPU 112 and is arranged to execute instructions for initializing and handling tasks associated with the functions of the various components of the long-range base station control module 502 (as described below). The embedded processor 510 includes serial-to-parallel interfaces (SPI) 512 and 514.

The SPI 512 is coupled to the UHF transceiver 520 and is arranged for coupling communications between the UHF transceiver 520 and the embedded processor 510. Such communications include, for example, configuration and status commands sent by the embedded processor 510 to the UHF transceiver 520 and sending information to and receiving information from the UHF transceiver 520. The UHF transceiver 520 is arranged for transmitting and receiving via antenna 522.

The SPI 514 is coupled to the LF transceiver 530 and is arranged for coupling communications between the LF transceiver 530 and the embedded processor 510. Such communications include, for example, configuration and status commands sent by the embedded processor 510 to the LF transceiver 530 as well as sending information to and receiving information from the LF transceiver 530. The LF transceiver 530 is typically activated after wakeup and query functions have been executed.

The LF transceiver 530 generates a low frequency (LF) signal (18-150 kHz), which can be used for precise localization of the key fob 600. The LF transceiver 530 is arranged for transmitting and receiving via one or more stick antennas such as stick antennas 532, 534, 536, and 538. A plurality of stick antennas can be used to enhance the accuracy (e.g., over signal-strength-only calculations) by using triangulation methods (such as time-of-arrival comparisons) that evaluate signals received from the plurality of stick antennas that are located in various locations around the vehicle. Accordingly, the location of the key fob 600 can be determined (e.g., such as whether the key fob is inside the host vehicle 500, on the driver's side, on the passenger's side, and the like) so that commands (such as starting the car) can be selectively enabled in accordance with the determined location of the key fob 600.

The long-range base-station control module 502 is arranged with a system interface 540 for sending and receiving information across one or more networks of the host vehicle 500. For example, the long-range base-station control module 502 is operable to control access to various functions of the host vehicle in response to communications with the key fob 600.

The power supply 550 is arranged to receive power from a transportable power source such as the car battery 560 that is used to power the host vehicle 500. The transportable power source is a power source (such as a car battery) and is arranged for providing power to active components of the long-range base-station control module 502. The transportable power source can be battery, solar cell, alternator, inductive field, fuel cell, capacitor, and the like such that the host vehicle 500 is capable of normal operation without being physically tethered (e.g., via a power cord) to utility-supplied power, for example. The transportable power supply has physical format (such as dimensions and weight) that is suited for being transported in an operational vehicle (e.g., that can carry persons using the key fob 600).

The transportable power supply is for providing power that is typically unregulated and has a normal voltage operating range of 7 to 16 volts (nominally 12 volts). The power supply 550 is typically a low dropout (LDO) power supply is arranged for supplying power to active components of the base-station control module. The output voltage of the power supply 550 is regulated at 5 volts over the normal operating voltage range of the car battery 560.

Figure 6:
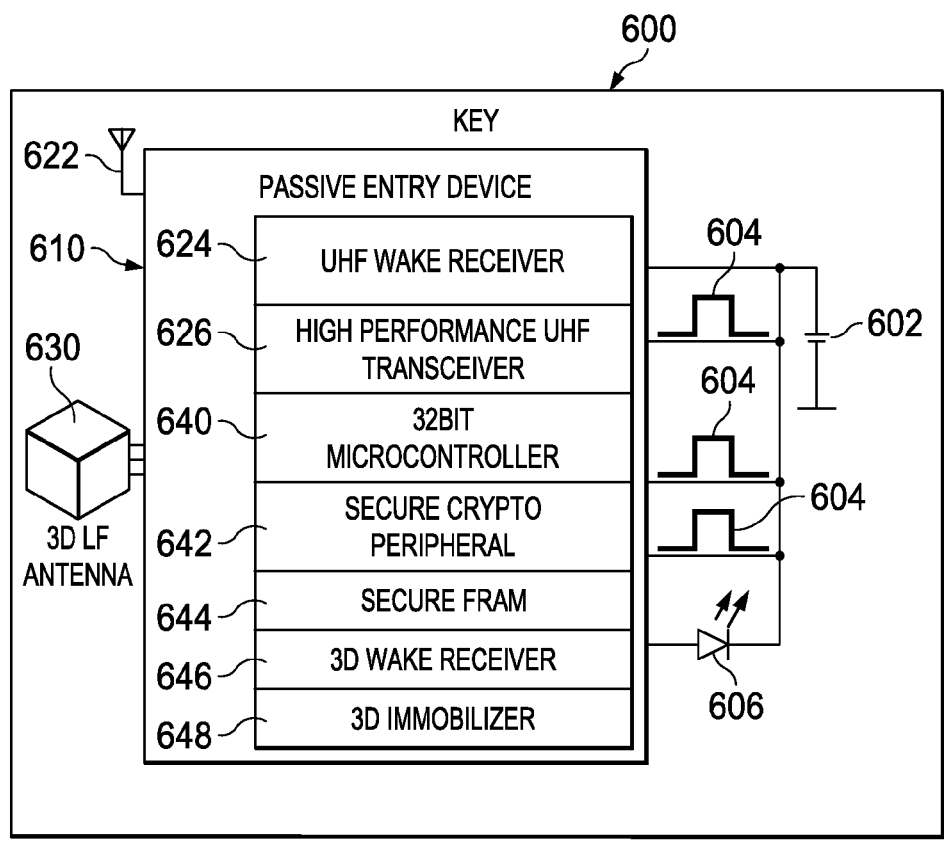
FIG. 6 is a block diagram illustrating a multiple-band electronic key in accordance with example embodiments of the disclosure.

FIG. 6 is a block diagram illustrating a multiple-band electronic key in accordance with example embodiments of the disclosure. Generally described, key fob 600 is an electronic key that includes a portable power source (such as coin cell 602), buttons 604, indicator 606, a passive entry device 610, UHF antenna 622, and a three-dimensional (3D) LF antenna 630 (which is arranged for communicating with each of the stick antennas 532, 534, 536, and 538 of LF transceiver 530 being positioned and oriented to allow for precise localization of the key fob 600).

The portable power source is a power source (such as coin cell 602) and is arranged for providing power to active components of electronic UHF of the key fob 600. The portable power source can be battery, solar cell, alternator, inductive field, fuel cell, capacitor, and the like such that the key fob 600 is capable of normal operation without being physically tethered (e.g., via a power cord) to utility-supplied power, for example. The portable power supply has physical format (such as dimensions and weight) that is suited for being carried by a normal person using the key fob 600.

Buttons 604 are arranged for providing user input so that a user can select a command for transmitting to a paired base-station control module (such as long-range base-station control module 502). Selectable commands include "lock," "unlock," "panic," and the like. Indicator 606 is arranged to provide an indication of functioning of the key fob 600.

The passive entry device 610 includes a UHF wake receiver 624, a high performance UHF transceiver 626, a 32-bit microcontroller 640, a secure cryptography (crypto) peripheral 642, a secure memory such as FRAM (ferroelectric RAM) 644, a three-dimensional wake receiver 646, and a three-dimensional immobilizer 648. The passive entry device 610 is arranged for communicating with the long-range base-station control module 502 via the UHF transmitter 620 (and UHF antenna 622) and the three-dimensional LF antenna 630.

The 32-bit microcontroller 640 is arranged to control and coordinate the various components of the passive entry device 610 and to provide processing support to the various components as needed. The secure cryptographic peripheral 642 is arranged to execute and/or facilitate executing cryptographic instructions used for authentication and secure communications. The secure FRAM 644 is an example non-volatile memory for storing data and computer executable instructions used by the 32-bit microcontroller 640 and the secure cryptographic peripheral 642.

The passive entry device 610 includes an LF backup channel for passive entry functions in situations where UHF noise is sufficiently high to block reception of a UHF wakeup signal. The three-dimensional wake receiver 646 is responsive to an LF wakeup signal, should an LF wakeup signal be optionally broadcast by the long-range base-station control module 502. The LF wakeup signal can optionally be transmitted (periodically or intermittently) in response to a measurement of an amount of UHF noise that exceeds a threshold. Similarly the LF wakeup signal can optionally be transmitted periodically, such as once per second, which typically does not result in a noticeable delay by a user of the key fob 600. The LF wakeup signal can be transmitted in an interleaved manner so that one or more UHF wakeup signals are sent in between the transmission of two (e.g., otherwise consecutive or adjacent in time) LF wakeup signals.

The three-dimensional immobilizer 648 is operable to provide backup access to the host vehicle 500 in case, for example, of a substantially discharged key fob battery 602. When the key fob 600 is in close proximity (such as less than around 10 cm) of an antenna (such as one of the stick antennas 532, 534, 536, and 538), the key fob receives operational power from an LF field generated by the antenna (e.g., instead of the discharged the battery). The three-dimensional immobilizer 648 allows start of the host vehicle 500 engine after successful authentication of the key fob 600 (which is then being powered by host vehicle 500-supplied power).

The wake receiver 624 is responsive to an UHF wakeup signal that is transmitted using one or more selected frequencies in a frequency range of 300 MHz through 2.4 GHz (UHF). The wake receiver 624 is arranged to wake up one or more active components of the passive entry device 602, including the high performance UHF transceiver 626. The wake receiver 624 operates (e.g., in sleep mode) by scanning the receiver input for the wakeup pattern (which is normally provisioned as stored data when the key fob 600 is paired with the long-range base-station control module 502). In an example embodiment, the wake receiver 624 consumes less than 1 µA (micro-Amperes) of power when operating at 128 bits per second with 242 ms (millisecond) latency and consumes less than 5 µA of power when operating at 1024 bits per second with 30.5 ms latency.

The high performance UHF transceiver 526 is arranged to transmit and receive UHF communications between the host vehicle 500 and the paired key fob (such as key fob 600). Such communications are described below with respect to FIG. 7.

Figure 7:
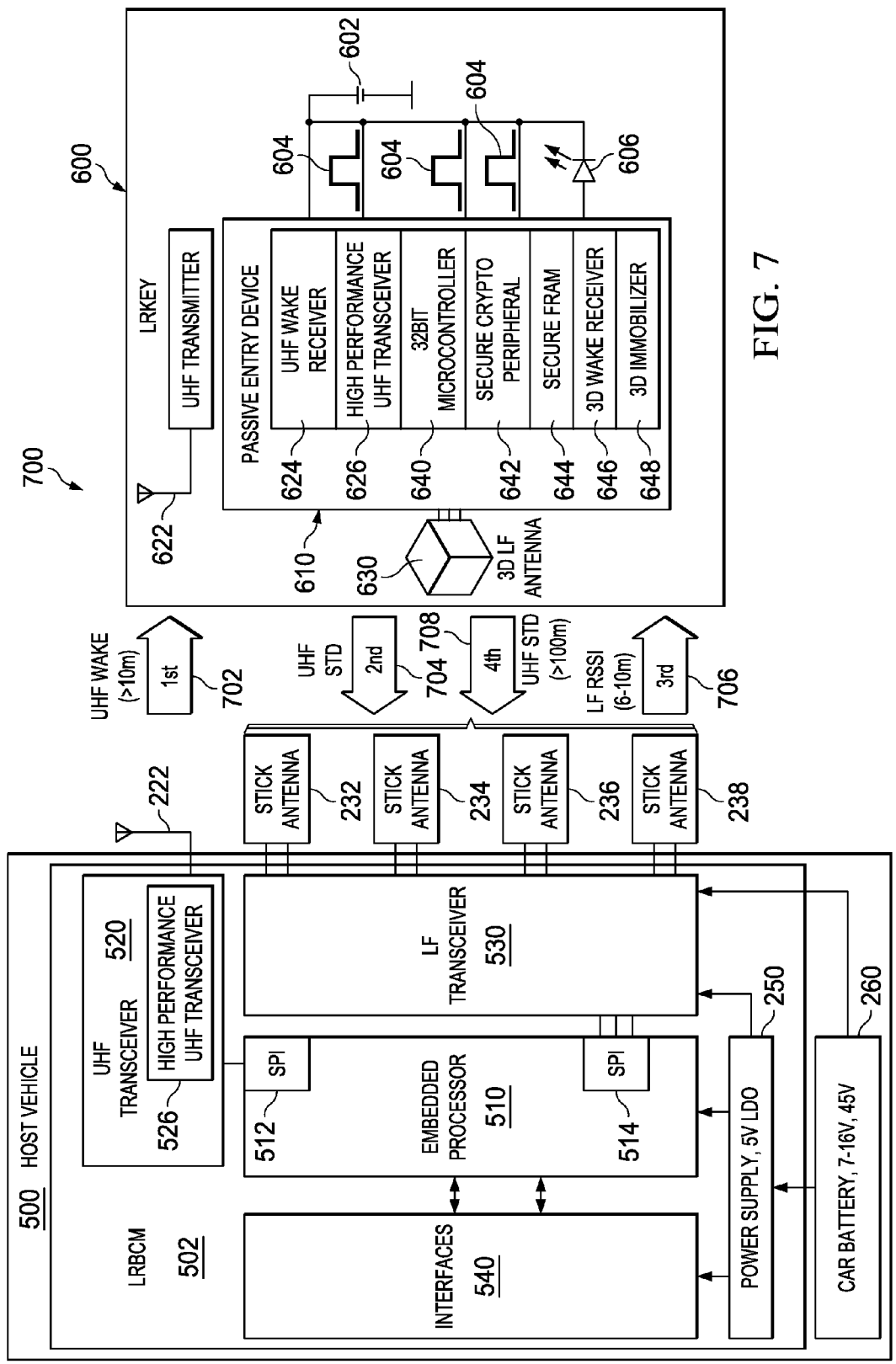
FIG. 7 is a system diagram illustrating communications of a multiple-band identification and ranging system in accordance with example embodiments of the disclosure.

FIG. 7 is a system diagram illustrating communications of a multiple-band identification and ranging system in accordance with example embodiments of the disclosure. Generally described, system 700 includes a long-range base-station control module 502 that has been paired with a key fob 600.

As described above, the paired key fob 600 includes transmitters and receivers suitable for communicating with the long-range base-station control module 502. The paired key fob 600 is typically provisioned with encryption keys and protocols that are paired to the long-range base-station control module 502. The paired key fob 600 (including any duplicates, spares, or replacement key fobs) is uniquely provisioned (e.g., by a vehicle manufacturer or dealer) to provide exclusive and/or secure communications to the long-range base-station control module 502. Accordingly, the paired key fob 600 can be uniquely authenticated by the long-range base-station module 502.

In an example scenario as illustrated in FIG. 7, key fob 600 is initially in a sleep mode, during which the power consumption of the (e.g., battery-operated) key fob 600 is greatly reduced (e.g., to conserve battery charge). The key fob 600 is typically carried in a purse, pocket, or hand of a user, and is arranged to be activated by proximity to the long-range base-station control module 502 despite a variety of possible (e.g., physical) orientations of the key fob 600.

Accordingly, the key fob 600 functions as a passive entry device, which typically does not require intentional user input to trigger at least some functions of the key fob 600 (e.g., including a wakeup function of key fob 600).

When a user of the key fob 600 approaches a location within around 10 or more meters of an antenna of a long-range base-station control module 502 that is located in a host vehicle 500, the wake receiver 624 of the key fob 600 detects a UHF wakeup signal 702 that is transmitted by the UHF high performance UHF transceiver 526 of the long-range base-station control module 502. The UHF wake signal 702 is normally transmitted by the UHF wake transmitter 530 on a continuous or repeated (e.g., to reduce power consumption of the host vehicle 500 car battery) basis to reduce latency times in waking up the key fob 600. For example, the wake signal 702 can be transmitted once every second such that user of the key fob 600 does not encounter any noticeable delay (e.g., due to latency encountered when electronically unlocking the host vehicle 500) when entering the host vehicle 500. The UHF wake transmitter is arranged to stop transmitting the UHF wake signal 702 in response to an indication from key fob 600 is in an active mode (e.g., has been woken up by the UHF wake signal 702).

The wake receiver 624 of the key fob 600 is arranged to detect the UHF wakeup signal 702, at a range of over 10 meters. The wake receiver 624 is arranged to receive the wakeup signal 702 despite being oriented in any of a number of directions (e.g., while being in a purse, pocket, or hand). When the wake receiver 624 detects the UHF wakeup signal 702, the wake receiver 624 directs one or more components of the key fob 600 to exit a low power mode (e.g., a sleep mode) and enter an active mode (which increases power consumption of the key fob 600) where active components of the passive entry device 610 are actively powered.

When the key fob 600 enters the active mode (e.g., where the high performance UHF transceiver 626 is powered up), the key fob 600 transmits a UHF signal 704, for example, to initiate authentication procedures for authenticating the key fob 600 to the long-range base-station control module 502. The UHF signal 704 is transmitted using a power that, at least, is sufficient to cover the current distance of the key fob 600 to the host vehicle 500 (which, per the range of the wakeup signal 702, can be up to around 10 meters or more). When the credentials supplied by the key fob 600 in the UHF signal 704 are validated by the long-range base-station control module 502, the host vehicle 500 can, for example, execute one or more limited functions such as a "welcome illumination" or other comfort functions. Because, at this point in time, the key fob 600 has not been precisely localized, the functions available for execution are can be limited (e.g., such that starting the host vehicle is prohibited when the location of the key fob 600 has not been precisely localized).

To precisely localize the key fob 600, the long-range base-station control module 502 is arranged to use an LF channel to determine a more accurate location of the key fob 600 with respect to the host vehicle 500. The LF transceiver 530 is coupled to the each of the stick antennas 532, 534, 536, and 538. The LF transceiver 530 is arranged to perform a localization routine (such as an RSSI routine) to determine a relative location of the key fob 600 by transmitting one or more signals such as LF signal 706 via each of the stick antennas used in the localization routine.

The LF signal 706 is transmitted using a power level that, at least, is sufficient to cover the distance of the host vehicle 500 to the key fob 600 when the key fob is in a close or intermediate range (such as within around 4 through 6 meters). The LF signal 706 can be transmitted using a higher power level to achieve a range (such as around 6 through 10 or more meters) and/or by using a higher-sensitivity three-dimensional wake receiver 646 for RSSI measurement, which is substantially close to the range of the UHF wakeup signal 702. Despite the increase in power required using the LF channel, increased resolution in the localization determination is achieved because of the avoidance of UHF damping that occurs in greater distances (such as distances greater than 4 meters) when using a UHF channel for localization. Accordingly, a location of the key fob 600 relative to each participating stick antenna can be determined, and a precise location of the key fob 600 is determined in response to evaluating the relative locations of the key fob 600 to the respective stick antenna.

In response to receiving one or more signals such as LF signal 706, the key fob 600 generates one or more localization reply signals, such as signal 708. Signal 708 is typically transmitted as a UHF signal via high performance UHF transceiver 626, although the LF channel can be used (e.g., on-demand in situations where substantial amounts of UHF noise are detected). The signal 708 can be transmitted using high power such that the signal 708 can be received by the long-range base-station module 502 at distances of more than around 100 meters (and, for example, to be intelligible in the presence of UHF noise). The localization reply signals received by the long-range base-station control module 502 can be used to determine a precise, relative location of the key fob 600 to the host vehicle 500 (in accordance with the arrangement of the stick antennas on the host vehicle that participate in the localization routine) as described above.

Figure 8:
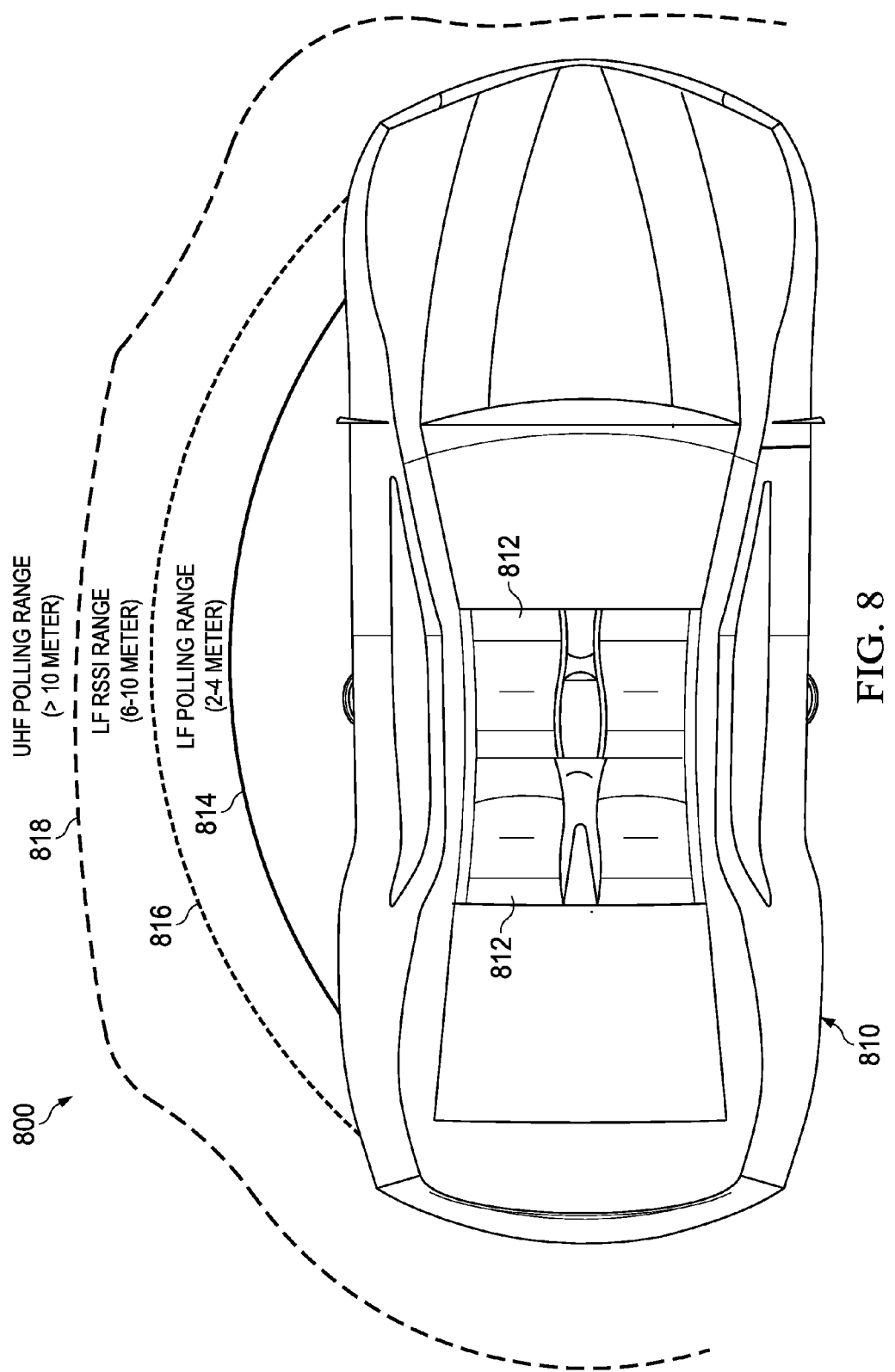
FIG. 8 is a system diagram illustrating relative ranges of a multiple-band identification and ranging system in accordance with example embodiments of the disclosure.

FIG. 8 is a system diagram illustrating relative ranges of a multiple-band identification and ranging system in accordance with example embodiments of the disclosure. Generally described, system 800 includes a secure area such the interior 812 of host vehicle 810. The host vehicle 810 includes a long-range base-station control module 502 (as illustrated in FIG. 5). Host vehicle 810 is a vehicle such as host vehicle 500. In various embodiments, secure area can be a vehicle, building, room, outdoor area, device, and the like for which physical and/or functional access restrictions are desired.

The long-range base-station control module 502 is coupled to the stick antennas 532, 534, 536, and 538, which are arranged in various positions (not shown) of the host vehicle 810 to optimize the performance of the localization routines. The stick antennas 532, 534, 536, and 538 are arranged such that the localization routines are able to determine the relative location of the key fob 600 (e.g., the polar or rectangular coordinates of key fob 600 with respect to a reference point that is associated with the host vehicle 500). The stick antennas 532, 534, 536, and 538 are also arranged such that the localization routines are able to determine whether the key fob 600 is in the interior 812 of the host vehicle 810.

Various transmission ranges are illustrated with respect to the host vehicle 810. The actual limits of the various transmission ranges vary in response to operational conditions such as atmospheric conditions, radio noise, battery strength, and the like.

Range 814 is the LF polling range, which extends from the interior of host vehicle 812 and outwards up to around 2 through 4 meters. As discussed above, the LF polling wakeup capability is provided as a backup to the disclosed UHF-based wakeup polling (e.g., which is used when sufficient amounts of UHF noise inhibit the use of a UHF channel for wakeup polling).

Range 816 is the LF RSSI range, which extends from the interior of host vehicle 812 and outwards up to around 6 through 10 meters. As discussed above, the range 816 can be reduced to an intermediate range of up to around 4 through 6 meters to conserve power (e.g., when localization in the range of 6 through 10 meters is not needed).

Range 818 is the UHF polling range, which extends from the interior of host vehicle 812 and outwards to around 10 meters or more. As discussed above, using the UHF channel for wakeup polling saves a considerable amount of power over using an LF channel for wakeup polling. Providing the LF channel-based polling wakeup capability as a backup to the UHF-based wakeup polling and using the LF channel for localization allows for, for example, substantial decreases in power and maintains accuracy of localization over conventional solutions.

In an embodiment, a controller (e.g., such as a microcontroller or a digital signal processor) is used to control the signal strength and/or polarization of signals 702, 704, 706, and 708. The variables are software programmable, which allows more flexibility for implementing the disclosed control schemes and provides an enhanced ability to adaptively adjust to dynamically changing conditions for optimized system performance.

In various embodiments, the above described components can be implemented in hardware or software, internally or externally, and share functionality with other modules and components as illustrated herein. For example, the antenna 622 can be implemented outside of a device and/or upon a substrate (e.g., circuit board) upon which the passive entry device 610 is located.

The combination of the long range UHF low power wake function and the LF localization functions can be used in various embodiments and used in various identification or localization services. For example, the electronic key can be embodied in a "smart-card-" and/or "identification badge-" device format and used to identify and localize users carrying such electronic keys. The determined identification and localization information can be used to track and/or control movement of authorized users, even within a secured area. (The secured areas need not be delimited by physical boundaries such as walls, fences, doors, and the like.)

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A control system, comprising:
a UHF (ultra-high frequency) transmitter arranged for transmitting to a paired electronic key a UHF wakeup signal having a frequency in a UHF frequency range;
a receiver for receiving an acknowledgement reply transmitted from the paired electronic key in response to the UHF wakeup signal; and
an LF (low frequency) transmitter that is arranged to transmit a plurality of LF wakeup signals comprising adjacent LF wakeup signals to the paired electronic key, wherein the UHF transmitter transmits one or more UHF wakeup signals in between the transmission of each adjacent LF wakeup signal of the plurality of LF wakeup signals, wherein the plurality of LF wakeup signals is transmitted in response to a determination that a measured amount of UHF noise exceeds a threshold.

2. The system of claim 1, wherein the UHF (ultra-high frequency) transmitter and the LF transmitter are powered by a transportable power source.

3. The system of claim 2 further comprising a processor for evaluating the acknowledgement reply to authenticate the paired electronic key and to grant access to a secure area when the acknowledgement reply has been successfully authenticated.

4. The system of claim 3, wherein the secure area is inside of a vehicle for transporting the transportable power source.

5. The system of claim 1, wherein the LF transmitter is installed in the vehicle.

6. The system of claim 5, comprising the LF transmitter arranged for transmitting to the paired electronic key the plurality of LF wakeup signals having a frequency in an LF frequency range, wherein the LF transmitter consumes more power transmitting the plurality of LF wakeup signals than the power that is consumed by the UHF transmitter when transmitting the UHF wakeup signal.

7. The system of claim 6, wherein an LF wakeup signal range is less than a UHF wakeup signal range.

8. The system of claim 6, wherein the UHF transmitter is arranged to stop transmitting the UHF wakeup signal when the paired key is in an active mode.

9. An electronic key, comprising:
- a UHF (ultra-high frequency) receiver arranged for receiving from a paired electronic base-station UHF wakeup signals having a frequency in a UHF frequency range;
- a transmitter for generating an acknowledgement reply transmitted from the electronic key in response to the UHF wakeup signals; and
- an LF (low frequency) receiver that is arranged to receive a plurality of LF wakeup signals comprising adjacent LF wakeup signals after transmitting the acknowledgement reply, wherein the UHF receiver is arranged to receive the UHF wakeup signals in between the reception of each adjacent LF wakeup signal, wherein the LF wakeup signals are received in response to a determination that a measured amount of UHF noise exceeds a threshold.

10. The electronic key of claim 9, wherein the UHF frequency range is 300 MHz-2.4 GHz, and the LF wakeup signals have a frequency range of 18-150 Khz.

11. The electronic key of claim 9, wherein the electronic key has a physical format of a key fob; and the UHF receiver and the LF receiver are powered by a portable power source.

12. The electronic key of claim 11, wherein the acknowledgement reply that is transmitted in response to receiving of the UHF wakeup signals is a UHF acknowledgement reply.

13. A method of authentication, comprising:
- transmitting from a base-station to a paired electronic key a UHF wakeup signal having a frequency in a UHF frequency range;
- receiving at the base-station an acknowledgement reply transmitted from the paired electronic key in response to the UHF wakeup signal; and
- transmitting LF localization signals in response to receiving the acknowledgement reply, wherein the localization signals are for determining a location of the paired electronic key; and
- transmitting from the base-station to the paired electronic key a plurality of LF wakeup signals comprising adjacent LF wakeup signals having a frequency in a LF frequency range, wherein one or more UHF wakeup signals is transmitted in between the transmission of each adjacent LF wakeup signal, wherein the plurality of LF wakeup signals is transmitted in response to a determination that a measured amount of UHF noise exceeds a threshold.

14. The method of claim 13, wherein the paired electronic key is powered by portable power source and the base-station is powered by a transportable power source.

15. The method of claim 14, comprising waking up the electronic key in response to receiving one of the UHF wakeup signal and the LF wakeup signal.

* * * * *